United States Patent
Wegelin (10) Patent No.: US 10,348,122 B2
(45) Date of Patent: *Jul. 9, 2019

(54) POWERING A PLURALITY OF DISPENSERS

(71) Applicant: GOJO Industries, Inc., Akron, OH (US)

(72) Inventor: Jackson William Wegelin, Stow, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/996,640

(22) Filed: Jun. 4, 2018

(65) Prior Publication Data

US 2018/0278084 A1 Sep. 27, 2018

Related U.S. Application Data

(63) Continuation of application No. 14/990,268, filed on Jan. 7, 2016, now Pat. No. 9,991,738.

(60) Provisional application No. 62/100,603, filed on Jan. 7, 2015.

(51) Int. Cl.
*H02J 7/34* (2006.01)
*H02J 7/14* (2006.01)
*H02J 1/14* (2006.01)

(52) U.S. Cl.
CPC ............ *H02J 7/345* (2013.01); *H02J 1/14* (2013.01)

(58) Field of Classification Search
CPC .... H02J 7/34; H02J 7/345; H02J 9/002; H92J 1/14
See application file for complete search history.

*Primary Examiner* — An T Luu
(74) *Attorney, Agent, or Firm* — Cooper Legal Group, LLC (57) ABSTRACT

One or more techniques and/or systems are provided for providing power to a plurality of dispensers. For example, a supply coupler, such as an alternating current to direct current power converter, is coupled to an energy storage component and/or a load coupler of a power distribution apparatus. The supply coupler provides power over the load coupler to one or more dispensers for operation. The supply coupler provides power to the energy storage component for energy storage. Responsive to a load on the power distribution apparatus exceeding a supply current of the power provided by the supply coupler (e.g., multiple dispensers may attempt to perform concurrent dispense events), the energy storage component may discharge energy to provide additional power to one or more dispensers to facilitate concurrent dispense events. Because the power distribution apparatus may connect to multiple dispensers, a cord management device may be used for power cord management.

20 Claims, 11 Drawing Sheets

POWERING A PLURALITY OF DISPENSERS

CROSS-REFERENCE TO RELATED APPLICATIONS

This application claims priority to and is a continuation of U.S. Non-Provisional patent application Ser. No. 14/990,268, filed on Jan. 7, 2016 and titled "POWERING A PLURALITY OF DISPENSERS," which claims priority to and is a non-provisional of U.S. Provisional Patent Application No. 62/100,603, filed on Jan. 7, 2015, both of which are incorporated herein by reference in their entirety.

TECHNICAL FIELD

The instant application is generally directed towards systems and techniques for powering a plurality of dispensers. In particular, an energy storage component is configured to discharge energy for powering dispensers when a load on a power distribution apparatus exceeds a supply current, and thus multiple dispensers may perform concurrent dispense events.

BACKGROUND

Many locations, such as hospitals, factories, casinos, expo centers, etc., may utilize devices for hygiene, such as dispensers. For example, a dispenser may dispense a liquid material, powder material, aerosol material, and/or other materials (e.g., soap, anti-bacterial gels, cleansers, disinfectants, lotions, etc.). Some dispensers, such as countertop installed dispensers, may operate based upon power supplied from an electrical outlet. For example, an alternating current to direct current power converter (AC to DC power converter) may convert AC power from the electrical outlet to DC power used to operate a dispenser. Unfortunately, many buildings may lack adequate numbers of power outlets and/or may resort to using unsightly amounts of power cords in order to operate a desired number of dispensers (e.g., a casino may install 8 countertop dispensers that are spaced 3 feet from one another, but the casino may only have 2 electrical outlets within 15 feet of the countertop dispensers).

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

Among other things, one or more systems and/or techniques for providing power to a plurality of dispensers are provided herein. For example, a power distribution apparatus comprises a supply coupler (e.g., an alternating current to direct current power converter configured to plug into an electrical outlet). The power distribution apparatus comprises an energy storage component (e.g., a super capacitor, a series of one or more capacitors, etc.) coupled to the supply coupler. The power distribution apparatus comprises a load coupler (e.g., a power rail, a power cord, a cooper trace, an electrical connection to a power cord, or other powered connection over which power is transferred to the plurality of dispensers for operation) that is coupled to the supply coupler and the energy storage component. The load coupler comprises a first coupling element (e.g., a first integrated power cord or a first electrical connection to a first detachable power cord) for coupling the load coupler to a first dispenser. The load coupler comprises a second coupling element (e.g., a second integrated power cord or a second electrical connection to a second detachable power cord) for coupling the load coupler to a second dispenser.

The supply coupler supplies power to the energy storage component (e.g., for energy storage) and to the load coupler (e.g., for providing the power to the first dispenser through the first coupling element and to the second dispenser through the second coupling element). The energy storage component is configured to discharge energy when a load on the power distribution apparatus by the first dispenser and/or the second dispenser exceeds a supply current of power provided by the supply coupler (e.g., the first dispenser and the second dispenser may concurrently attempt to perform dispense events of material, which may draw a current greater than the supply current). In this way, multiple concurrent dispense events may be facilitated for multiple dispensers because the energy storage component discharges energy to supply additional power used to perform such dispense events.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. In other instances, structures and devices are illustrated in block diagram form in order to facilitate describing the claimed subject matter.

A plurality of dispensers, such as countertop dispensers that operate from power supplied by an alternating current to direct current power converter (AC to DC power converter), may be installed at a location that comprises an inadequate number of electrical outlets. For example, a casino may desire to install 6 dispensers that are spaced 4 feet apart from one another, but merely 2 electrical outlets are located within 25 feet of the dispensers. Thus, the casino may restore to using many different power cords and power strips, which may be unsightly and/or unmanageable. Attempting to utilize a single AC to DC power converter to power more than one dispenser may result in merely a single dispenser being capable of operating at any given time (e.g., merely a single dispenser may perform a dispense event of material, such as soap, at any given time). Accordingly, as provided herein, a power distribution apparatus may comprise a supply coupler (e.g., an AC to DC power converter or an electrical connection to the AC to DC power converter) that may supply power to a plurality of dispensers. The power distribution apparatus may comprise an energy storage component (e.g., one or more capacitors configured to store energy from the AC to DC power converter) that may provide additional power, by discharging stored energy, to the plurality of dispensers so that multiple concurrent dispense events may be facilitated. The power distribution apparatus may be associated with a cord management device used to manage power cords connecting from the power distribution apparatus to the plurality of dispensers and/or the AC to DC power converter (e.g., a mechanical cord hook that is internal or external to an enclosure of the power distribution apparatus, a cord reel, a hanking means such as a tie wrap, a spring wound spool, a mechanical clamp, etc.). The power distribution apparatus may comprise a cover that may mitigate undesirable tampering with the power distribution apparatus.

Figure 1:
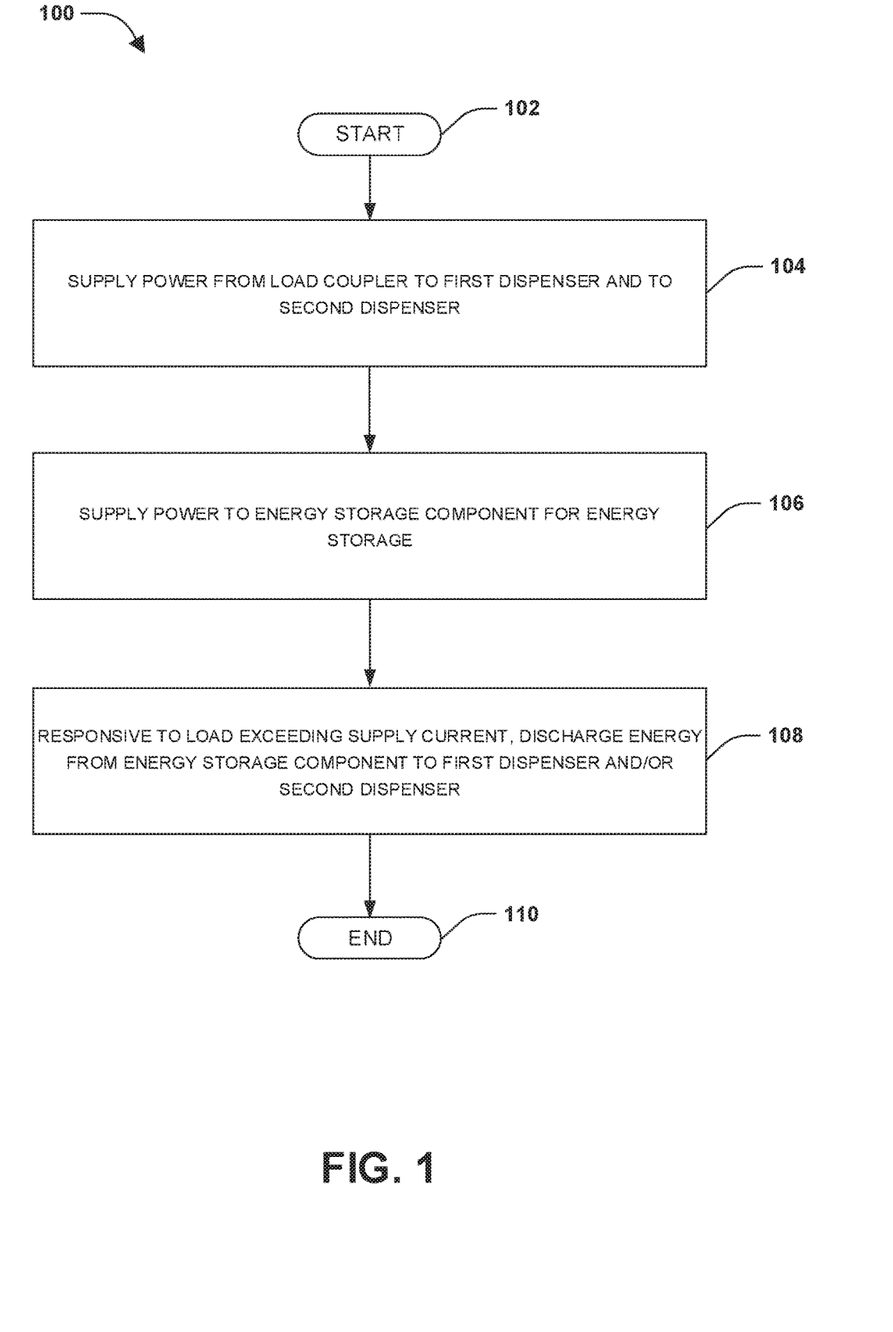
FIG. 1 is a flow diagram illustrating an example method of providing power to a plurality of dispensers.

An embodiment of providing power to a plurality of dispensers is illustrated by an exemplary method 100 of FIG. 1. At 102, the method starts. At 104, power may be supplied from a load coupler to a first dispenser, a second dispenser, and/or any other number of dispensers (e.g., 3 dispensers, 6 dispensers, 8 dispenser, etc.). The power may be supplied from an AC to DC power converter that converts AC power to DC power for the dispensers. The power may comprise a supply current (e.g., about 1 Amp to about 20 Amps, or any other current). In an example, a dispenser may utilize about 5 Joules per dispense event such as about 5 Watts to about 6 Watts for about 1 second where an average of about 1 Amp and a peak of about 20 Amps may be drawn.

At 106, the power may be supplied to an energy storage component for energy storage. In an example, the energy storage component may comprise a super capacitor, a set of capacitors, or any other energy storage device. For example, the energy storage component may comprise a set of capacitors configured in series (e.g., three 10 farad capacitors or any other number and/or size of capacitors, which may be based upon a number of dispensers within the plurality of dispensers) and a set of balancing resistors (e.g., three 100,000 ohm resistors or any other number and/or size of resistors, which may be based upon the set of capacitors) configured in parallel with the set of capacitors.

At 108, responsive to a load, by the first dispenser (e.g., attempting to perform a first dispense event), the second dispenser (e.g., attempting to perform a second dispense event, and/or other dispensers, exceeding the supply current, energy may be discharged from the energy storage component to the first dispenser, the second dispenser, and/or the other dispensers. For example, the supply current may provide enough current for a single dispense event (e.g., having a peak current, such as about 20 Amps), but not multiple concurrent dispense events. Accordingly, the energy storage component discharges the energy to one or more dispensers in order to provide adequate power for multiple concurrent dispense events. At 110, the method ends.

Figure 2:
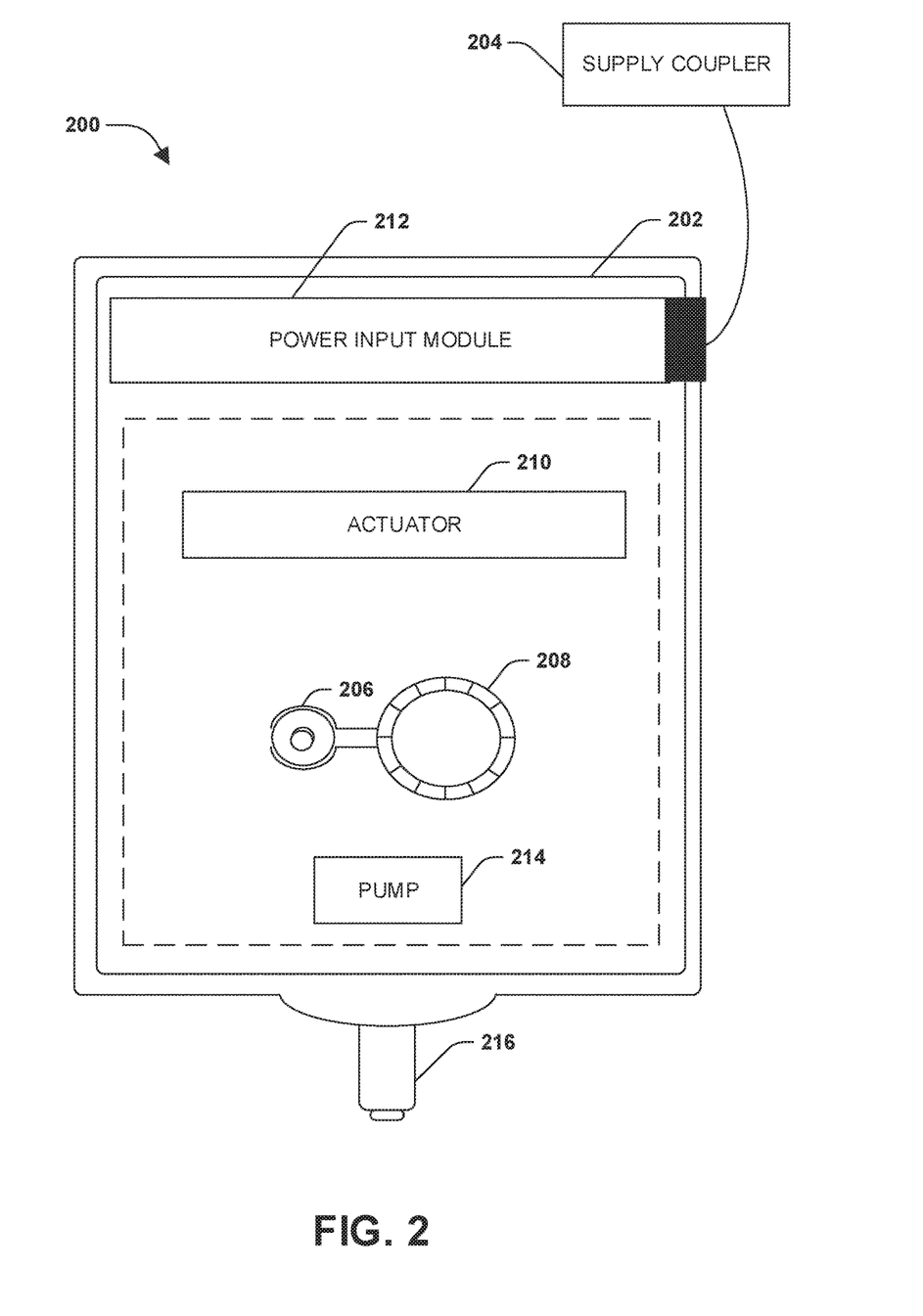
FIG. 2 is a component block diagram illustrating an example of a dispenser powered by a supply coupler.

FIG. 2 illustrates a dispenser 200 that may be powered by a supply coupler 204. The supply coupler 204 may comprise an AC to DC power converter or an electrical connection to the AC to DC power converter. The AC to DC power converter may connect to an electrical outlet, and may convert AC power from the electrical outlet to DC power. The DC power may be supplied (e.g., through a load coupler) to a power input module 212 of the dispenser 200 for powering operation of the dispenser 200. The dispenser 200 may comprise a housing 202 configured to hold a refill container comprising a material (e.g., a liquid material, a powder material, an aerosol material, an antibacterial product, medicine, etc.). The housing 202 may comprise various mechanical and/or electrical components that facilitate operation of the dispenser 200, such as one or more components that dispense material from the refill container. In an example, the housing 202 may comprise an actuator 210, the power input module 212 used as a power source, a motor 206, a drivetrain 208 (e.g., a gear train), and/or other components (e.g., a pump 214 and/or a dispenser nozzle 216, which may be associated with the refill container or comprised within the housing 202). The power source may provide power to the actuator 210, the motor 206, and/or other components. The actuator 210 may be configured to detect a dispense request (e.g., a user may place a hand in front of an actuation sensor; the user may press an actuation button or lever; etc.). The actuator 210 may be configured to invoke the motor 206 to operate the drivetrain 208 so that the pump 214 dispenses material from the refill container through the dispenser nozzle 216.

Figure 3:
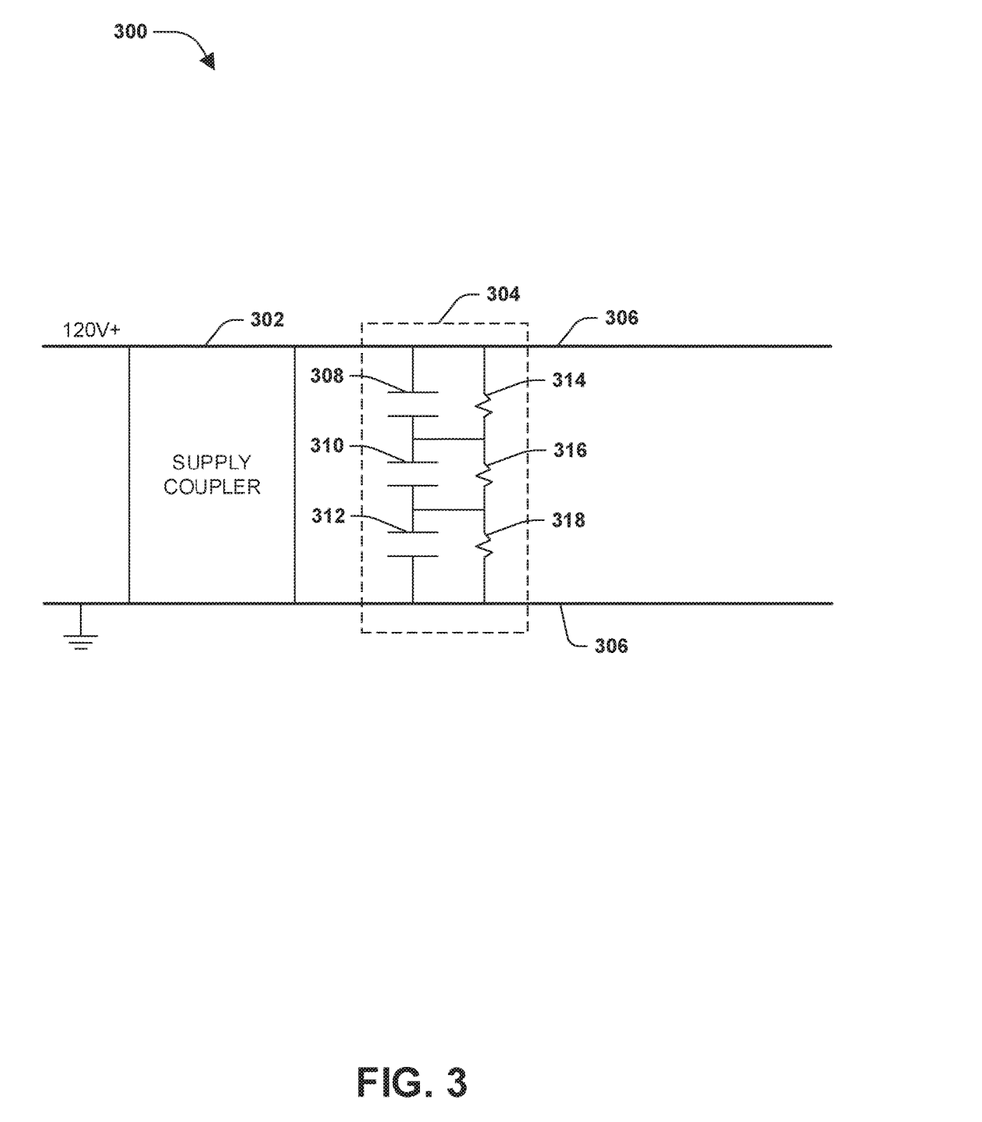
FIG. 3 is a component block diagram illustrating an example power distribution apparatus.

FIG. 3 illustrates an example of a power distribution apparatus 300 for providing power to a plurality of dispensers. The power distribution apparatus 300 may comprise a supply coupler 302, such as an AC to DC power converter, which may connect to an AC power supply such as an electric outlet with a positive voltage connection (e.g., a 120 volt connection) and a ground connection. The supply coupler 302 may be coupled to an energy storage component 304. In an example, the energy storage component 304 may comprise a first capacitor 308, a second capacitor 310, a third capacitor 312, and/or any other number of capacitors in series. The energy storage component 304 may comprise a first balancing resistor 314, a second balancing resistor 316, a third balancing resistor 318, and/or any other number of balancing resistors that are in parallel with the capacitors. In an example, a current limiting device, not shown, may be configured to limit an amount of current drawn from the energy storage component 304. The energy storage component 304 may be configured to store energy based upon power supplied by the supply coupler 302.

The power distribution apparatus 300 may comprise a load coupler 306 (e.g., a positive voltage rail, a negative voltage or ground rail, a copper trace on a printed circuit board, a power cord, an electrical connection used to connect to a power cord of a dispenser, etc.). The load coupler 306 may be coupled to the supply coupler 302 and/or the energy storage component 306. The supply coupler 302 may provide power, having a supply current, to the load coupler 306, which may be supplied to a plurality of dispensers.

The energy storage component 304 may be configured to discharge energy when a load on the power distribution apparatus 300 exceeds the supply current. For example, multiple dispensers may draw current from the power distribution apparatus 300 in an attempt to perform dispense events. The energy storage component 304 may discharge the energy to provide additional power for the dispensers to complete the dispense events. In this way, concurrent dispense events may be facilitated.

Figure 4:
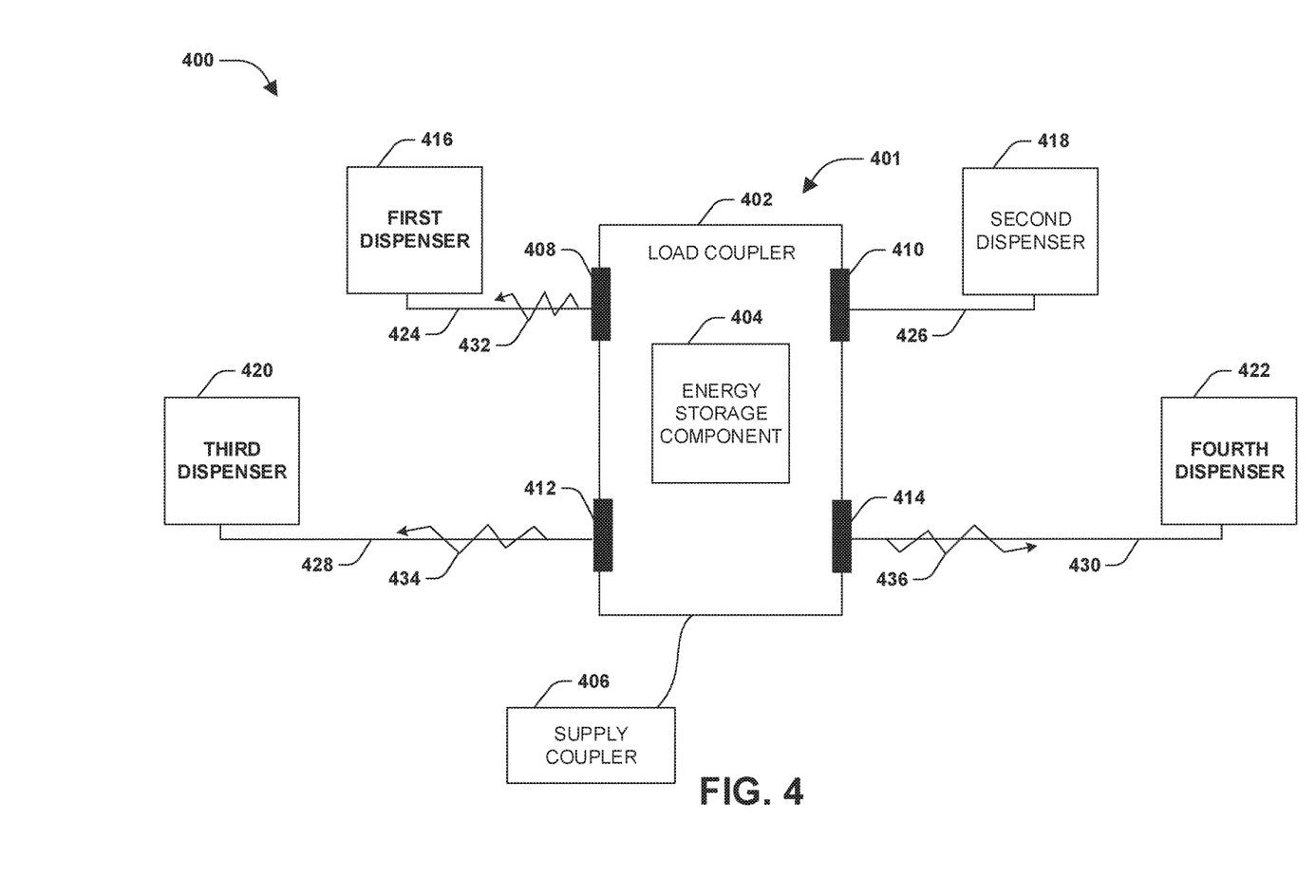
FIG. 4 is a component block diagram illustrating an example power distribution apparatus for providing power to a plurality of dispensers.

FIG. 4 illustrates an example 400 of a power distribution apparatus 401 for providing power to a plurality of dispensers, such as a first dispenser 416, a second dispenser 418, a third dispense 420, a fourth dispenser 422, and/or other dispensers not illustrated. The power distribution apparatus 401 may comprise a supply coupler 406, such as an AC to DC power converter, that is coupled to a load coupler 402 and/or coupled to an energy storage component 404 of the power distribution apparatus 401.

The load coupler 402 comprises a first coupling element 408 associated with a first power cord 424 (e.g., the first coupling element 408 may be an electrical connection to a removable power cord or may comprise a power cord integrated into the power distribution apparatus 401) that couples the load coupler 402 to the first dispenser 416. The load coupler 402 comprises a second coupling element 410 associated with a second power cord 426 (e.g., the second coupling element 410 may be an electrical connection to a removable power cord or may comprise a power cord integrated into the power distribution apparatus 401) that couples the load coupler 402 to the second dispenser 418. The load coupler 402 comprises a third coupling element 412 associated with a third power cord 428 (e.g., the third coupling element 412 may be an electrical connection to a removable power cord or may comprise a power cord integrated into the power distribution apparatus 401) that couples the load coupler 402 to the third dispenser 420. The load coupler 402 comprises a fourth coupling element 414 associated with a fourth power cord 430 (e.g., the fourth coupling element 414 may be an electrical connection to a removable power cord or may comprise a power cord integrated into the power distribution apparatus 401) that couples the load coupler 402 to the fourth dispenser 422. It may be appreciated that any number of dispensers may be coupled to the power distribution apparatus 401.

In an example, the first power cord 424 and the second power cord 426 may be a first length (e.g., 6 feet each). The third power cord 428 and the fourth power cord 430 may be a second length (e.g., 12 feet each). It may be appreciated that the power cords may be any length.

In an example, the first dispenser 416, the third dispenser 420, and the fourth dispenser 422 may attempt to perform concurrent dispense events. The first dispenser 416 may attempt to draw first current 432 from the power distribution apparatus 401. The third dispenser 420 may attempt to draw second current 434 from the power distribution apparatus 401. The fourth dispenser 422 may attempt to draw third current 436 from the power distribution apparatus 401. Because the load on the power distribution apparatus 410, due to the first current 432, the second current 434, and the third current 436, may exceed a supply current of power provided by the power distribution apparatus 401, the energy storage component 404 may discharge energy in order to provide additional power to the first dispenser 416, the third dispenser 420, and/or the fourth dispenser 422 so that the dispense events may be performed concurrently.

Figure 5:
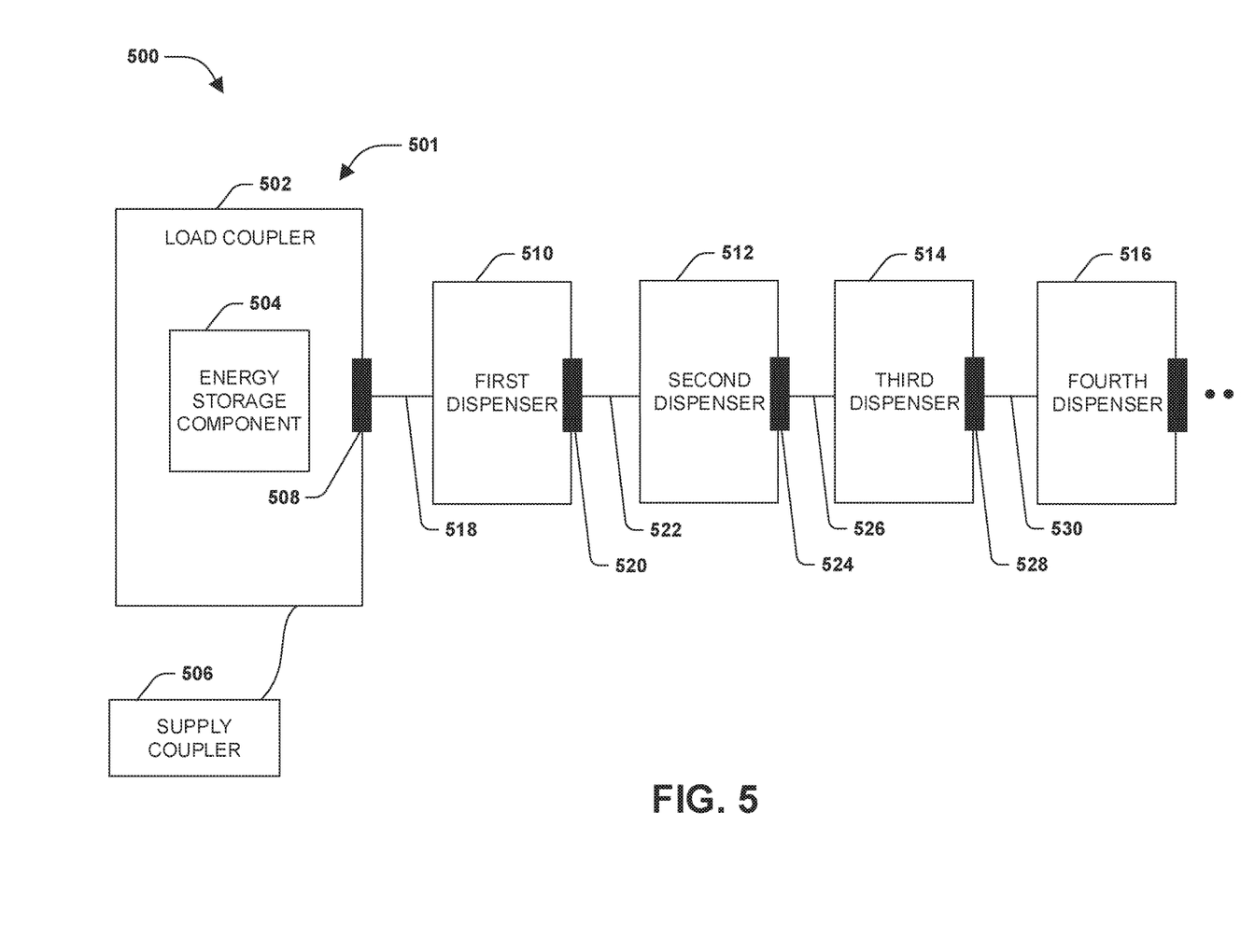
FIG. 5 is a component block diagram illustrating an example power distribution apparatus for providing power to a plurality of dispensers that are configured according to a daisy chain configuration.

FIG. 5 illustrates an example 500 of a power distribution apparatus 501 for providing power to a plurality of dispensers, such as a first dispenser 510, a second dispenser 512, a third dispenser 514, a fourth dispenser 516, and/or other dispensers not illustrated. The power distribution apparatus 501 may comprise a supply coupler 506, such as an AC to DC power converter, that is coupled to a load coupler 502 and/or an energy storage component 504 of the power distribution apparatus 501.

The load coupler 502 comprises a first coupling element 508 associated with a first power cord 518 (e.g., the first coupling element 508 may be an electrical connection to a removable power cord or may comprise a power cord integrated into the power distribution apparatus 502) that couples the load coupler 502 to the first dispenser 510. The second dispenser 512, the third dispenser 514, and/or the fourth dispenser 516 may be configured according to a daisy chain configuration. For example, the second dispenser 512 is connected by a second power cord 522 to a second coupling element 520 of the first dispenser 510, and thus the second dispenser 512 is coupled to the load coupler 502 by a daisy chain connection through the first dispenser 510 (e.g., power may be supplied by the supply coupler 506, through the load coupler 502, the first coupling element 508, the first power cord 518, the first dispenser 510, the second coupling element 520, and the second power cord 522 to the second dispenser 512).

The third dispenser 514 is connected by a third power cord 526 to a third coupling element 524 of the second dispenser 512, and thus the third dispenser 514 is coupled to the load coupler 502 by a daisy chain connection through the second dispenser 512 and the first dispenser 510 (e.g., power may be supplied by the supply coupler 506, through the load coupler 502, the first coupling element 508, the first power cord 518, the first dispenser 510, the second coupling element 520, the second power cord 522, the third coupling element 524, and the third power cord 526 to the third dispenser 514).

The fourth dispenser 516 is connected by a fourth power cord 530 to a fourth coupling element 528 of the third dispenser 514, and thus the fourth dispenser 516 is coupled to the load coupler 502 by a daisy chain connection through the third dispenser 514, the second dispenser 512, and the first dispenser 510 (e.g., power may be supplied by the supply coupler 506, through the load coupler 502, the first coupling element 508, the first power cord 518, the first dispenser 510, the second coupling element 520, the second power cord 522, the third coupling element 524, the third power cord 526, the fourth coupling element 528, and the fourth power cord 530 to the fourth dispenser 516).

In an example, the first dispenser 510, the second dispenser 512, and the fourth dispenser 516 may attempt to perform concurrent dispense events, which may result in a load on the power distribution apparatus 501 that exceeds a load current of power supplied by the power distribution apparatus 501. Accordingly, the energy storage component 504 may discharge energy across one or more coupling elements and/or power cords in order to provide additional power to the first dispenser 510, the second dispenser, and/or the fourth dispenser 516 so that the dispense events may be performed concurrently.

Figure 6:
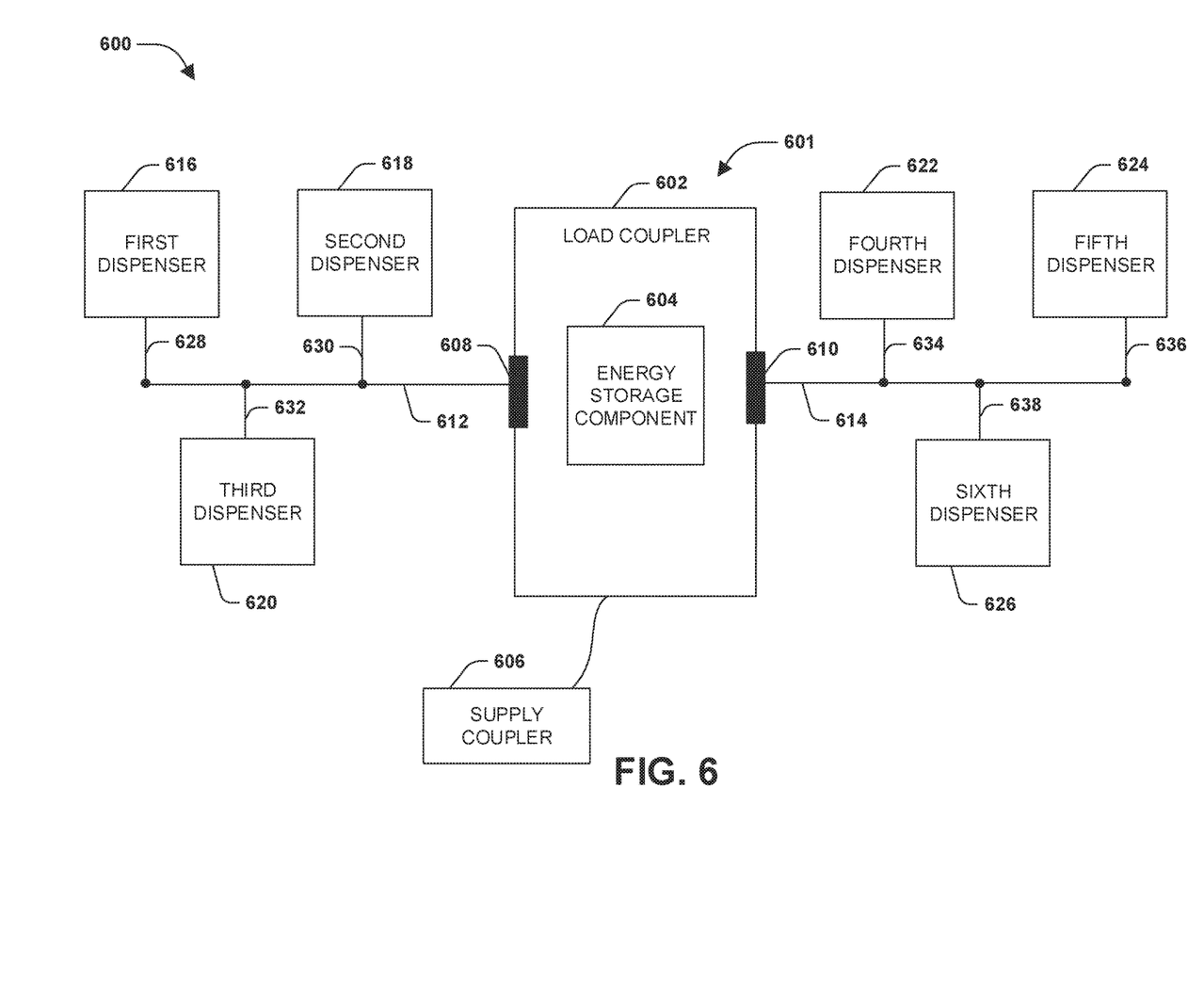
FIG. 6 is a component block diagram illustrating an example power distribution apparatus for providing power to a plurality of dispensers that are configured according to pigtail configuration.

FIG. 6 illustrates an example 600 of a power distribution apparatus 601 for providing power to a plurality of dispensers, such as a first dispenser 616, a second dispenser 618, a third dispenser 620, a fourth dispenser 622, a fifth dispenser 624, a sixth dispenser 626, and/or other dispensers not illustrated. The power distribution apparatus 601 may comprise a supply coupler 606, such as an AC to DC power converter, that is coupled to a load coupler 602 and/or an energy storage component 604 of the power distribution apparatus 601.

The load coupler 602 comprises a first coupling element 608 associated with a first power cord 612 (e.g., the first coupling element 608 may be an electrical connection to a removable power cord or may comprise a power cord integrated into the power distribution apparatus 601) and a second coupling element 610 associated with a second power cord 614 (e.g., the second coupling element 610 may be a power connection to a removable power cord or may comprise a power cord integrated into the power distribution apparatus 601). The dispensers may be connected to the power distribution apparatus 601 through one or more pigtail power cords. A pigtail power cord may comprise a coupling element that can mate with a dispenser. The pigtail power cord (e.g., a cord portion of the pigtail power cord) may be integrated into the first power cord 612 and/or the second power cord 614 or the pigtail power cord may be configured according to a detachable configuration such that the pigtail power cord can attach to and detach from the first power cord 612 and/or the second power cord 614.

The first dispenser 616 may be coupled to the power distribution apparatus 601 by a first pigtail power cord 628 connected to the first power cord 612 (e.g., a coupling element of the first pigtail power cord 628 may mate with the first dispenser 616). The second dispenser 618 may be coupled to the power distribution apparatus 601 by a second pigtail power cord 630 connected to the first power cord 612 (e.g., a coupling element of the second pigtail power cord 630 may mate with the second dispenser 618). The third dispenser 620 may be coupled to the power distribution apparatus 601 by a third pigtail power cord 632 connected to the first power cord 612 (e.g., a coupling element of the third pigtail power cord 632 may mate with the third dispenser 620). The fourth dispenser 622 may be coupled to the power distribution apparatus 601 by a fourth pigtail power cord 634 connected to the second power cord 614 (e.g., a coupling element of the fourth pigtail power cord 634 may mate with the fourth dispenser 622). The fifth dispenser 624 may be coupled to the power distribution apparatus 601 by a fifth pigtail power cord 636 connected to the second power cord 614 (e.g., a coupling element of the fifth pigtail power cord 636 may mate with the fifth dispenser 624). The sixth dispenser 626 may be coupled to the power distribution apparatus 601 by a sixth pigtail power cord 638 connected to the second power cord 614 (e.g., a coupling element of the sixth pigtail power cord 638 may mate with the sixth dispenser 626).

In an example, the first dispenser 616, the second dispenser 618, the fourth dispenser 622, the fifth dispenser 624, and the sixth dispenser 626 may attempt to perform concurrent dispense events, which may result in a load on the power distribution apparatus 601 that exceeds a load current of power supplied by the power distribution apparatus 601. Accordingly, the energy storage component 604 may discharge energy across one or more coupling elements and/or power cords in order to provide additional power to the first dispenser 616, the second dispenser 618, the fourth dispenser 622, the fifth dispenser 624, and/or the sixth dispenser 626 so that the dispense events may be performed concurrently.

Figure 7A:
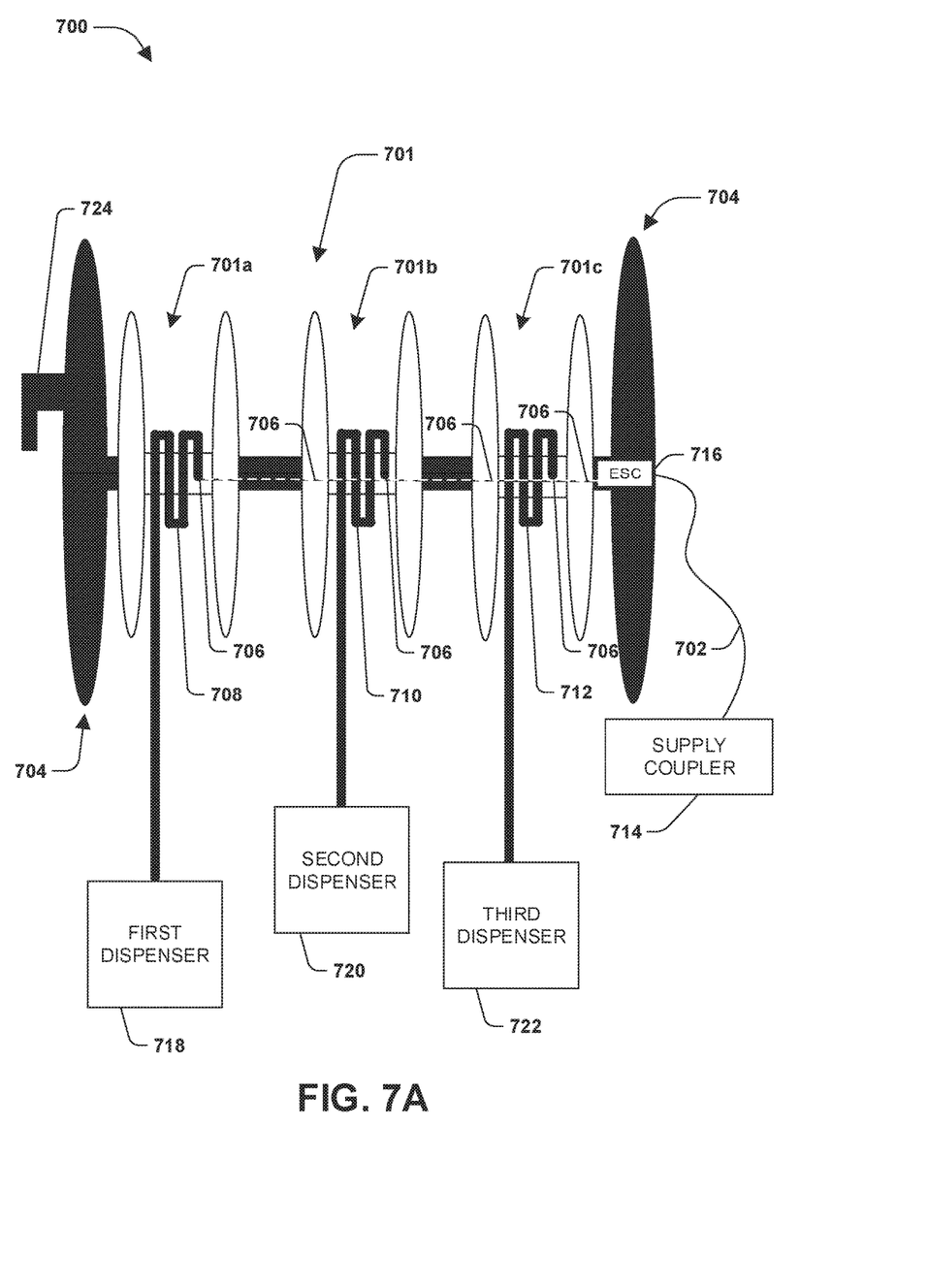
FIG. 7A is a component block diagram illustrating an example power distribution apparatus comprising a cord management device.

FIG. 7 illustrates an example of a power distribution apparatus 700 comprising a cord management device 701 for managing power cords associated with delivering power to a first dispenser 718, a second dispenser 720, a third dispenser 722, and/or other dispensers not illustrated. The power distribution apparatus 701 may comprise a supply coupler 704, such as an AC to DC power converter, that is coupled to a load coupler 706 (e.g., a power cord or conductive trace that may be located within a spool or other portion of the power distribution apparatus 700) and/or an energy storage component 716 of the power distribution apparatus 700. The power distribution apparatus 700 may comprise an enclosure 704 housing the energy storage component 716 and/or the load coupler 706. A cover, not illustrated, of the housing 704 may be used to mitigate undesirable access into the power distribution apparatus 700 (e.g., the cover may be placed over one or more cord reels to conceal such cord reels from sight).

The cord management device 701 may comprise a first cord reel 701a, a second cord reel 701b, and/or a third cord reel 701c. It may be appreciated that the cord management device 701 may comprise any number of cord reels, such as a fourth cord reel for a power supply cord 702 coupling the supply coupler 714 to the power distribution apparatus 700. A first power cord 708, connecting the first dispenser 718 to the power distribution apparatus 700 through the load coupler 706, may be wrapped around the first cord reel 701a in order to adjust a length of an exposed portion the first power cord 708 that is outside the enclosure 704 of the power distribution apparatus 700 (e.g., the first dispenser 718 may be located 3 feet from the power distribution apparatus 700, and thus 5 feet out of 8 total feet of the first power cord 708 may be wrapped around the first cord reel 701a).

A second power cord 710, connecting the second dispenser 718 to the power distribution apparatus 700 through the load coupler 706, may be wrapped around the second cord reel 701b in order to adjust a length of an exposed portion the second power cord 710 that is outside the enclosure 704 of the power distribution apparatus 700 (e.g., the second dispenser 720 may be located 1 foot from the power distribution apparatus 700, and thus 3 feet out of 4 total feet of the second power cord 710 may be wrapped around the second cord reel 701b). A third power cord 712, connecting the third dispenser 722 to the power distribution apparatus 700 through the load coupler 706, may be wrapped around the third cord reel 701c in order to adjust a length of an exposed portion the third power cord 712 that is outside the enclosure 704 of the power distribution apparatus 700 (e.g., the third dispenser 720 may be located 2 feet from the power distribution apparatus 700, and thus 6 feet out of 8 total feet of the third power cord 712 may be wrapped around the third cord reel 701c). In an example, the power distribution apparatus 700 may comprise a mount 724 for mounting the enclosure 704. For example, the mount 724 may be used to mount the enclosure 704 onto a wall. In this way, the cord management device 701 may manage power cords associated with the power distribution apparatus 700.

Figure 7B:
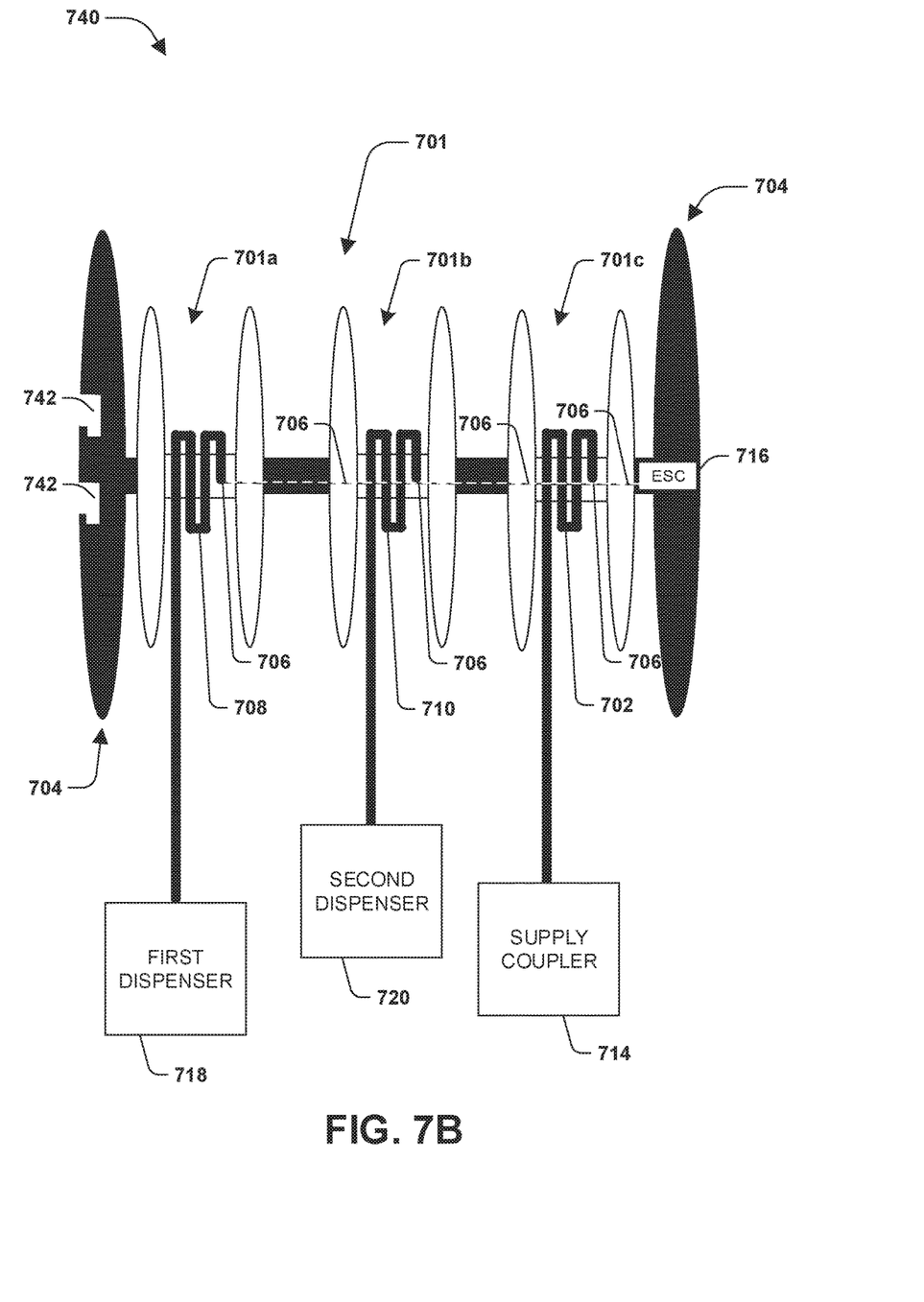
FIG. 7B is a component block diagram illustrating an example power distribution apparatus, comprising a cord management device, configured according to a second configuration.

FIG. 7B illustrates an example of the power distribution apparatus 700, comprising the cord management device 701, configured according to a second configuration 740. For example, the first power cord 708, connecting the first dispenser 718 to the power distribution apparatus 700 through the load coupler 706, may be wrapped around the first cord reel 701a in order to adjust the length of the exposed portion the first power cord 708 that is outside the enclosure 704 of the power distribution apparatus 700 (e.g., the first dispenser 718 may be located 3 feet from the power distribution apparatus 700, and thus 5 feet out of 8 total feet of the first power cord 708 may be wrapped around the first cord reel 701a). The second power cord 710, connecting the second dispenser 718 to the power distribution apparatus 700 through the load coupler 706, may be wrapped around the second cord reel 701b in order to adjust the length of the exposed portion the second power cord 710 that is outside the enclosure 704 of the power distribution apparatus 700 (e.g., the second dispenser 720 may be located 1 foot from the power distribution apparatus 700, and thus 3 feet out of 4 total feet of the second power cord 710 may be wrapped around the second cord reel 701b). The power supply cord 702, connecting the supply coupler 714 to the power distribution apparatus 700, may be wrapped around the third cord reel 701c in order to adjust a length of an exposed portion of the power supply cord 702 that is outside the enclosure 704 of the power distribution apparatus 700 (e.g., a wall outlet may be located 2 feet from the power distribution apparatus 700, and thus 6 feet out of 8 total feet of the power supply cord 702 may be wrapped around the third cord reel 701c). In an example, the power distribution apparatus 700 may comprise a mount 742 for mounting the enclosure 704 onto a wall (e.g., the mount 742 may comprise one or more recessed slots into which wall mounting brackets may fit to secure the enclosure 704 onto the wall).

Figure 7C:
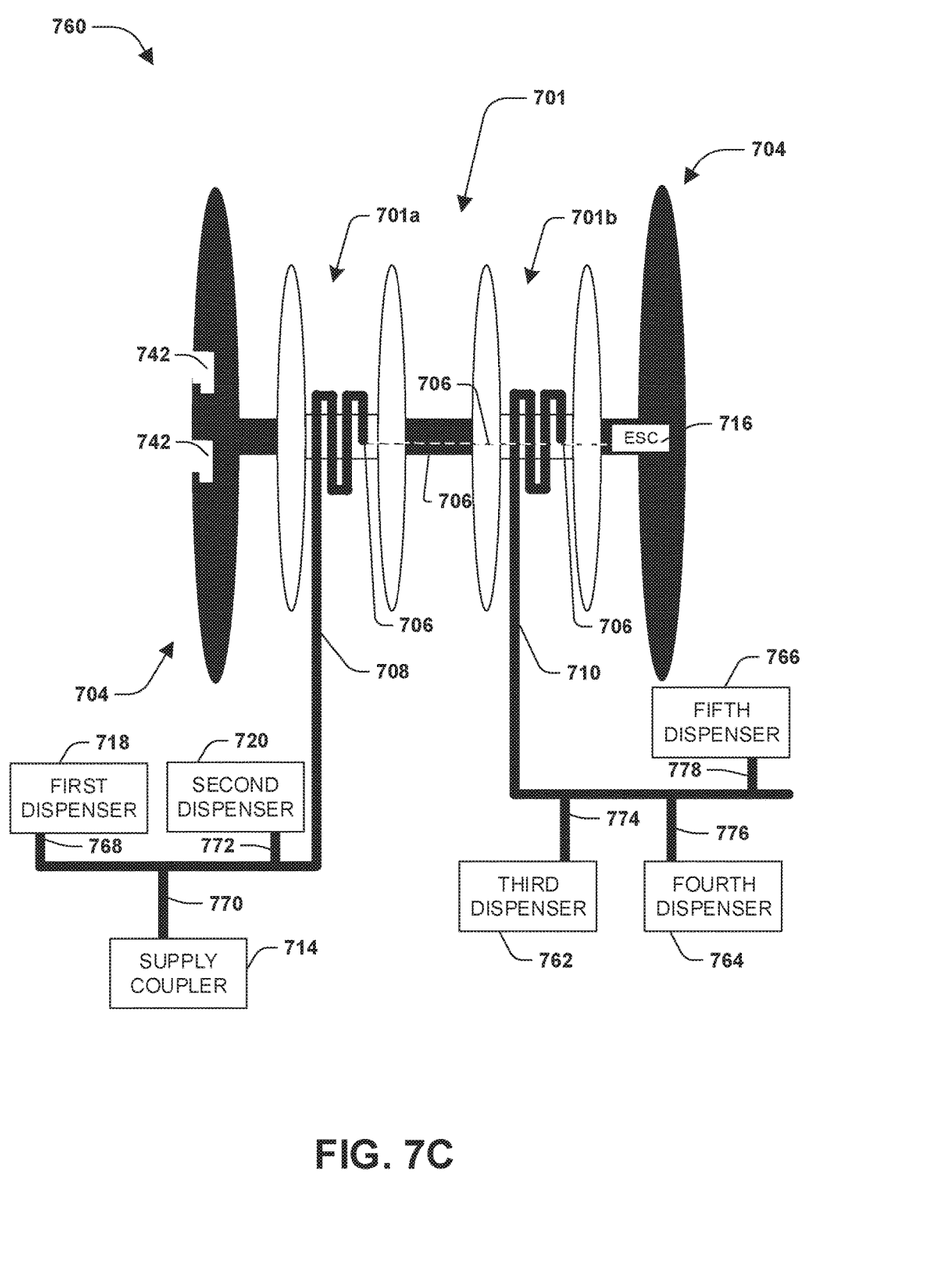
FIG. 7C is a component block diagram illustrating an example power distribution apparatus, comprising a cord management device, configured according to a third configuration.

FIG. 7C illustrates an example of the power distribution apparatus 700, comprising the cord management device 701, configured according to a third configuration 760. For example, the first power cord 708 may be wrapped around the first cord reel 701a in order to adjust the length of the exposed portion the first power cord 708 that is outside the enclosure 704 of the power distribution apparatus 700. One or more pigtail power cords may connect dispensers and/or the supply coupler 714 to the first power cord 708, such as a first pigtail power cord 768 connecting the first dispenser 718 to the first power cord 708, a second pigtail power cord 770 connecting the supply coupler 714 to the first power cord 708, and a third pigtail power cord 772 connecting the second dispenser 720 to the first power cord 708 (e.g., a coupling element of a pigtail power cord may mate with a dispenser). The second power cord 710 may be wrapped around the second cord reel 701b in order to adjust the length of the exposed portion the second power cord 710 that is outside the enclosure 704 of the power distribution apparatus 700. One or more pigtail power cords may connect dispensers and/or the supply coupler 714 to the second power cord 710, such as a fourth pigtail power cord 774 connecting a third dispenser 762 to the second power cord 710, a fifth pigtail power cord 776 connecting a fourth dispenser 764 to the second power cord 710, and a sixth pigtail power cord 778 connecting the fifth dispenser 766 to the second power cord 710.

Figure 8:
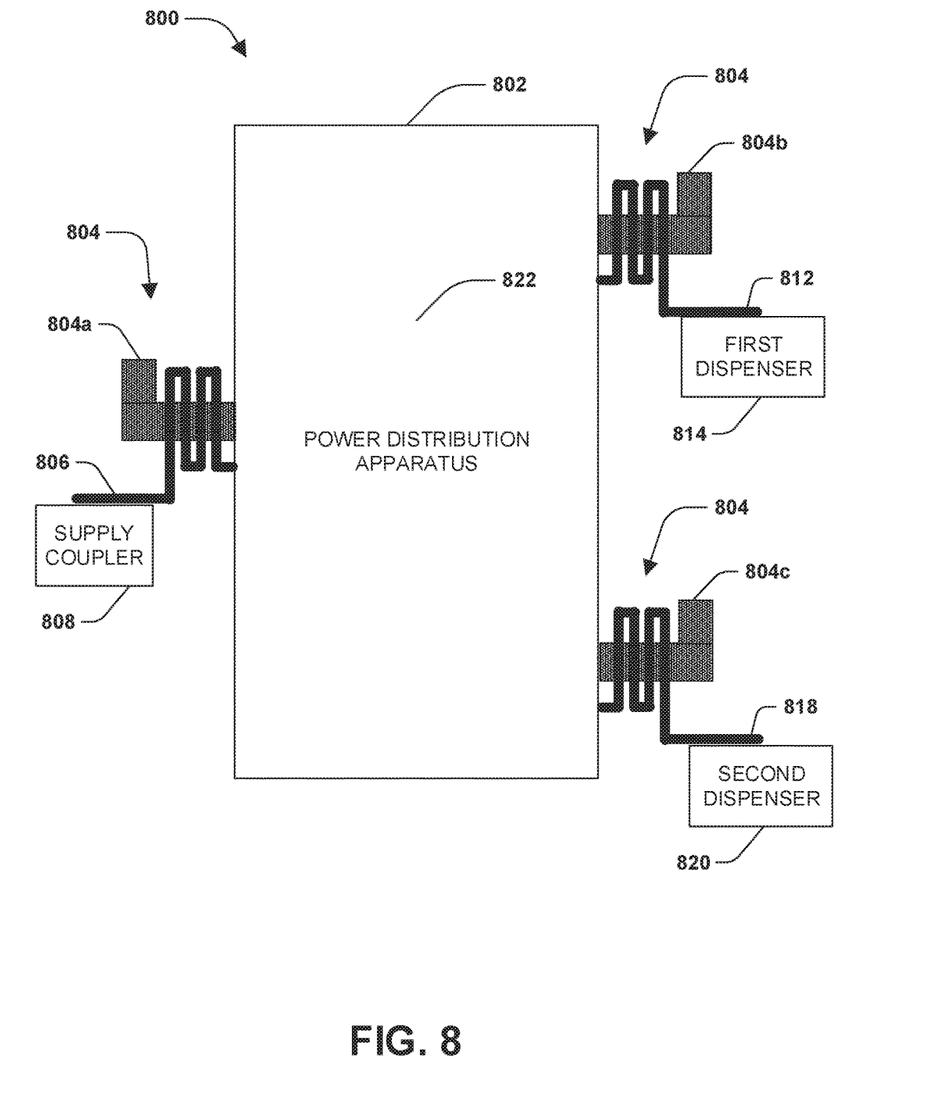
FIG. 8 is a component block diagram illustrating an example power distribution apparatus comprising a cord management device.

FIG. 8 illustrates an example of a power distribution apparatus 800 comprising a cord management device 804 for managing power cords associated with delivering power to a first dispenser 814, a second dispenser 820, and/or other dispensers not illustrated. The power distribution apparatus 800 may comprise a supply coupler 808, such as an AC to DC power converter, that is coupled to the power distribution apparatus 800 by a power supply cord 806. The power distribution apparatus 800 may comprise an enclosure 802 housing an energy storage component and/or a load coupler. A cover 822 of the housing 802 may be used to mitigate undesirable access into the power distribution apparatus 802, such as to protect the energy storage component and/or the load coupler from tampering or damage.

The cord management device 804 may comprise a first cord wrap 804a (e.g., a mechanical cord hook that may be internal or external to the housing 802) around which the power supply cord 806 may be wrapped for cord management. The cord management device 804 may comprise a second cord wrap 804b (e.g., a mechanical cord hook that may be internal or external to the housing 802) around which a first power cord 812, connecting the first dispenser 814 to the power distribution apparatus 800, may be wrapped for cord management. The cord management device 804 may comprise a third cord wrap 804c (e.g., a mechanical cord hook that may be internal or external to the housing 802) around which a second power cord 818, connecting the second dispenser 820 to the power distribution apparatus 800, may be wrapped for cord management. In this way, the cord management device 804 may manage power cords associated with the power distribution apparatus 800.

Figure 9:
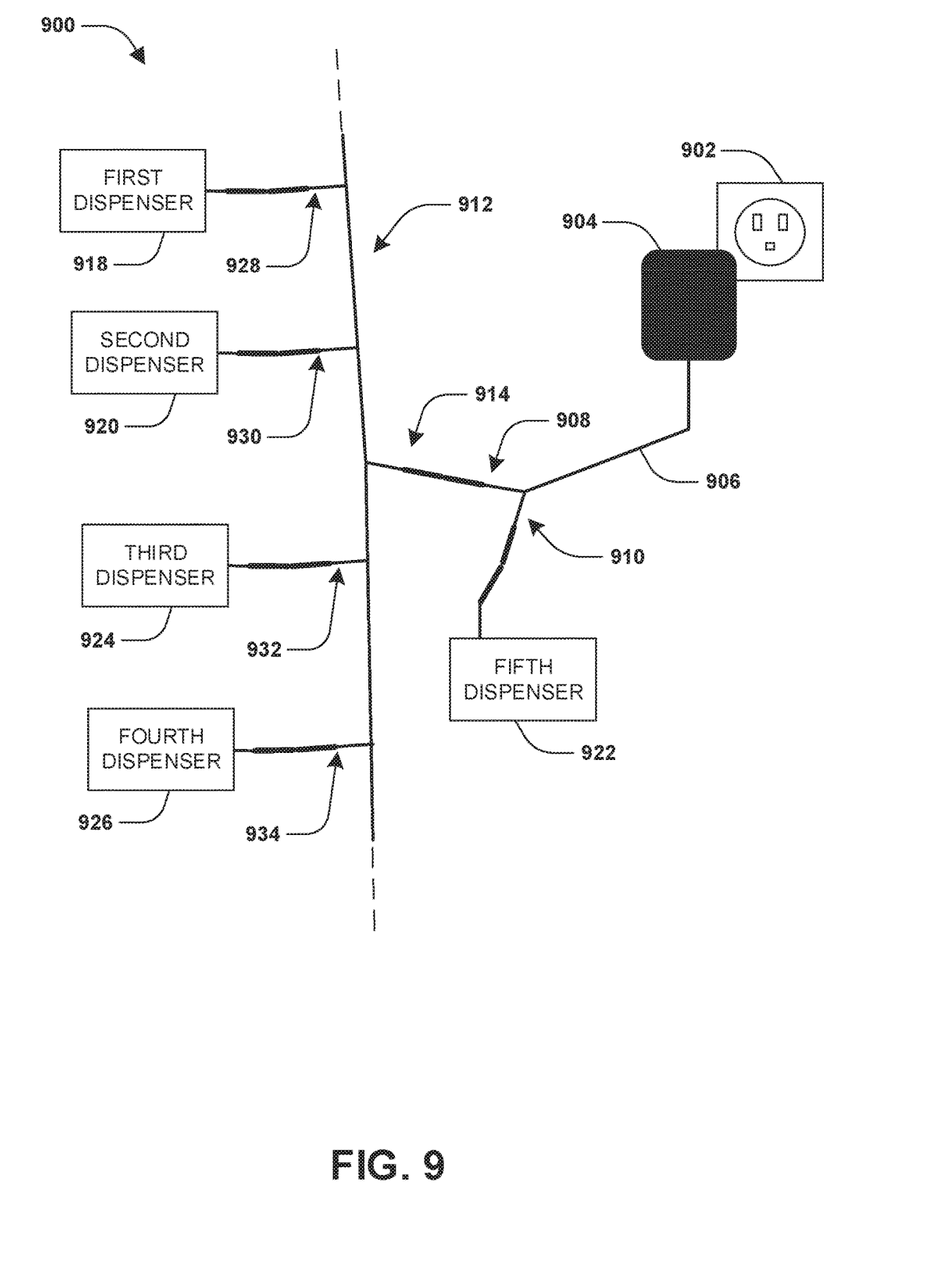
FIG. 9 is a component block diagram illustrating an example power distribution apparatus.

FIG. 9 illustrates an example of a power distribution apparatus 900 comprising a main power cord 912. The main power cord 912 comprises one or more pigtail power cords that can be coupled to dispensers, such as a first pigtail power cord 928 that can be coupled to a first dispenser 918, a second pigtail power cord 930 that can be coupled to a second dispenser 920, a third pigtail power cord 932 that can be coupled to a third dispenser 924, a fourth pigtail power cord 934 that can be coupled to a fourth dispenser 926, and a fifth pigtail power cord 914 (e.g., a coupling element of a pigtail power cord may mate with a dispenser). A power adapter 904 may comprise a cord 906 with a Y connector. The Y connector may comprise a first connection 908 (e.g., a male adapter or a female adapter) and a second connection 910 (e.g., a female adapter or a male adapter). The first connection 908 may be coupled to a pigtail power cord of the main power cord 912, such as the fifth pigtail power cord 914, so that the power adapter 904 may provide power, such as from an outlet 902, to the dispensers connected to the main power cord 912. The second connection 910 may be coupled to a dispenser, such as a fifth dispenser 922, so that the power adapter 904 may provide power to that dispenser.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

It will be appreciated that layers, features, elements, etc. depicted herein are illustrated with particular dimensions relative to one another, such as structural dimensions or orientations, for example, for purposes of simplicity and ease of understanding and that actual dimensions of the same differ substantially from that illustrated herein, in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" is used herein to mean serving as an example, instance, illustration, etc., and not necessarily as advantageous. As used herein, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A power distribution apparatus for providing power to a plurality of dispensers, comprising:
    a supply coupler; and
    an energy storage component coupled to the supply coupler, wherein:
        the supply coupler supplies power to at least the energy storage component, the supplied power having a supply property; and
        the energy storage component is configured to discharge energy when a load on the power distribution apparatus by at least one of a first dispenser or a second dispenser exceeds the supply property.

2. The power distribution apparatus of claim 1, the energy storage component comprising a set of capacitors configured in series.

3. The power distribution apparatus of claim 2, the energy storage component comprising a set of balancing resistors configured in parallel with the set of capacitors.

4. The power distribution apparatus of claim 1, wherein the supply property is a supply current.

5. The power distribution apparatus of claim 1, comprising a first power cord connected to the first dispenser and a second power cord connected to the second dispenser, the first power cord and the second power cord having a first length.

6. The power distribution apparatus of claim 5, the power distribution apparatus coupled to a third dispenser and a fourth dispenser.

7. The power distribution apparatus of claim 6, the power distribution apparatus connected to the third dispenser via a third power cord and connected to the fourth dispenser via a fourth power cord, the third power cord and the fourth power cord having a second length different than the first length.

8. The power distribution apparatus of claim 6, the energy storage component configured to discharge the energy when the load on the power distribution apparatus by at least one of the first dispenser, the second dispenser, the third dispenser, or the fourth dispenser exceeds the supply property.

9. The power distribution apparatus of claim 1, the energy storage component configured to discharge the energy to facilitate a first dispense event of the first dispenser concurrently with a second dispense event of the second dispenser.

10. A dispenser installation kit, comprising:
    a supply coupler configured to supply power to at least an energy storage component, the supplied power comprising a supply property;
    a power distribution apparatus comprising:
        the energy storage component configured to discharge energy, to facilitate a first dispense event of a first dispenser and a second dispense event of a second dispenser, when a load on the power distribution apparatus exceeds the supply property;
    a power supply cord for coupling the supply coupler to the energy storage component; and
    a cord management device for at least one of the power supply cord or one or more power cords associated with at least one of the first dispenser or the second dispenser.

11. The dispenser installation kit of claim 10, the cord management device comprising at least one of:
    a first cord reel for the power supply cord;
    a second cord reel for the first power cord; or
    a third cord reel for the second power cord.

12. The dispenser installation kit of claim 10, the cord management device comprising at least one of:
    a first cord wrap for the power supply cord;
    a second cord wrap for the first power cord; or
    a third cord wrap for the second power cord.

13. The dispenser installation kit of claim 10, the power distribution apparatus comprising:
    an enclosure housing the energy storage component; and
    a cover for the enclosure.

14. The dispenser installation kit of claim 10, the power distribution apparatus comprising:
    a first pigtail power cord for coupling a third dispenser to the first power cord;
    a second pigtail power cord; and
    a power adapter comprising a cord with a y connector comprising a first connector configured to connect to the second pigtail power cord and a second connector configured to connect to a dispenser.

15. The dispenser installation kit of claim 10, comprising:
    a first pigtail power cord for coupling a third dispenser to the first power cord; and
    a second pigtail power cord for coupling a fourth dispenser to the second power cord.

16. The dispenser installation kit of claim 10, comprising:
    a third power cord for coupling a third dispenser, through the second dispenser, to the power distribution apparatus according to a daisy chain configuration.

17. The dispenser installation kit of claim 15, at least one of the first power cord, the second power cord, the first pigtail power cord, or the second pigtail power cord configured according to a detachable configuration.

18. The dispenser installation kit of claim 10, comprising:
    a third power cord for coupling the power distribution apparatus to a third dispenser; and
    a fourth power cord for coupling the power distribution apparatus to a fourth dispenser, the first power cord and the second power cord having a first length, the third power cord and the fourth power cord having a second length different than the first length.

19. A method for providing power to one or more dispensers, comprising:
supplying power to at least a first dispenser, the power comprising a supply property;
supplying the power to an energy storage component for energy storage; and
responsive to a load by at least the first dispenser exceeding the supply property, discharging energy from the energy storage component to at least the first dispenser.

20. The method of claim 19, the discharging energy comprising:
facilitating a first dispense event of the first dispenser and a second dispense event of a second dispenser.

* * * * *